United States Patent

Martin et al.

[11] Patent Number: 6,113,388
[45] Date of Patent: Sep. 5, 2000

[54] DEVICE FOR REMOVING CARBON DEPOSITS ON SOLID OBJECTS

[75] Inventors: Gérard Martin; Luc Nougier, both of Foy les Lyons, France

[73] Assignee: Institut Francais du Petrole, Cedex, France

[21] Appl. No.: 09/350,138

[22] Filed: Jul. 9, 1999

[30] Foreign Application Priority Data

Jul. 13, 1998 [FR] France .................................. 98 09020

[51] Int. Cl.[7] ...................................................... F27B 9/00
[52] U.S. Cl. ........................... 432/128; 432/129; 432/163
[58] Field of Search ...................................... 432/128, 129, 432/132, 134, 168, 169, 210, 215, 217, 163, 164

[56] References Cited

U.S. PATENT DOCUMENTS 4,397,451 8/1983 Kinoshita et al. ....................... 432/128
5,624,255 4/1997 Hisada et al. ........................... 432/128

Primary Examiner—Denise L. Ferensic
Assistant Examiner—Gregory A. Wilson
Attorney, Agent, or Firm—Antonelli, Terry, Stout & Kraus, LLP

[57] ABSTRACT

A device for removing carbon deposits on solid objects, includes an inlet (102) for the objects to be treated, a zone (101a) for heating the objects having a feed (104) and an outlet for the heating gas, a zone (101b) for treating the objects by oxidation and/or gasification having a feed (105) and an outlet (108) for the gasification fluid, an outlet (118) for the treated objects. The heating zone (101a) and the treating zone (101b) are situated in a single enclosure (100) and comprise a substantially flat-bottomed vibrating element (101) intended for transport of the objects, the bottom allowing support of the objects, diffusion of the fluid through the objects and transmission of the vibrations. A zone (101c) for cooling solids, placed in the enclosure (100) downstream from the treating zone (101b) in relation to the direction of displacement of the solids in the enclosure (100), and a heater (115) external to enclosure (100) is provided.

12 Claims, 2 Drawing Sheets

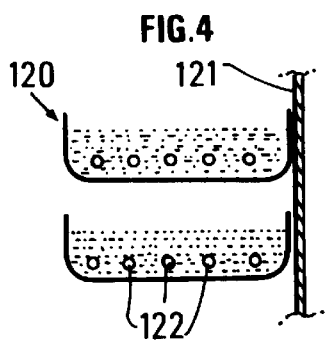
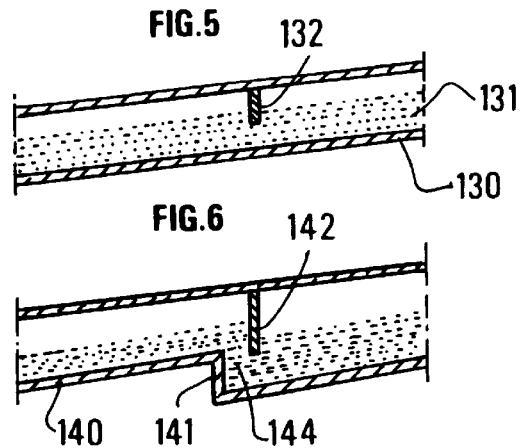
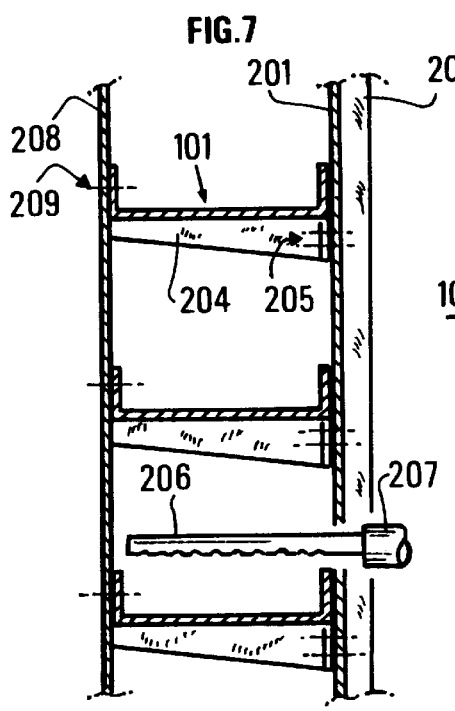
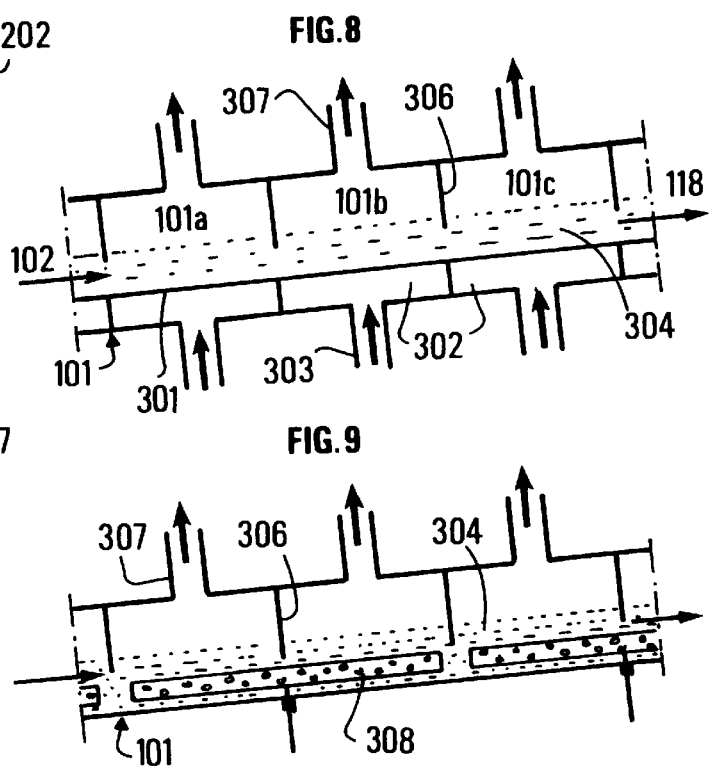

6,113,388

DEVICE FOR REMOVING CARBON DEPOSITS ON SOLID OBJECTS

FIELD OF THE INVENTION

The present invention relates to the field of solids treatment and more specifically to the total or partial removal of carbon deposits deposited on solids.

Oxidation, air, oxygen, steam or carbon dioxide gasification are envisaged to remove the carbon deposits.

The invention is particularly aimed at objects that cannot be treated in a fluidized bed, as justified below.

BACKGROUND OF THE INVENTION

As it is well-known (see Perry's Chemical Engineer's Handbook, $6^{th}$ edition, 9–40 Energy utilization, convension and resource conservation FIGS. 9–32 Basic types of mechanical stockers), removal of carbon deposits on solid objects by oxidation and/or gasification can be carried out in the same way as a coal combustion operation, on a travelling grate as shown in FIG. 1. The feed to be treated 1, stored in an enclosure, is laid gravitationally on a travelling grate 2 mounted on two rotating cylinders 3. The layer 4 formed is generally a few centimeters thick. It is heated by a heating means 5 mounted on a radiant arch 6, which may be a burner using an auxiliary fuel such as fuel oil or natural gas. The air or the gasification agent is injected below grate 2, it flows through layer 4, thanks to one or more vessels 7. The gas flow rates in each vessel can be adjusted individually in order to best adjust the thermal profile of the layer and to optimize conversion of the feed. The treated solids are discharged through device 8, whereas the gaseous effluents resulting from the treatment are extracted through a specific line and most often sent to a boiler or a heat exchanger for energy recovery.

This well-known type of device only allows to treat objects of a given size (characteristic size larger than 1 cm) because of channeling problems through the travelling grate and dust falls.

The treating temperatures are difficult to control because of the fixed nature of the layer formed, a layer in which thermal exchanges are low by definition.

Finally, travelling grate 2 regularly poses mechanical, fouling, sticking problems, etc.

Some of these drawbacks can be eliminated by using fluidized bed systems as shown in FIG. 2. According to this known concept, the feed to be treated, stored in an enclosure 11, is fed gravitationally into fluidized bed 12. The fluidized medium is obtained by blowing air or a gasification agent through a diffuser 13 under conditions known to the man skilled in the art. The treated solids are discharged, for example by overflow through a line 14, while the gaseous effluents leave the device via a pipe 15 and are sent for example to an exchanger on a recovery boiler.

This device must necessarily be equipped with a preheating means 16, that can be for example a combustion chamber for an auxiliary fuel placed on the air or gasification agent circuit.

In the case where the amount of heat produced in the fluidized medium is large, calories can be extracted by means of an immersed exchanger 17 in order to maintain the temperature of the medium within a given range.

This type of device (fluidized bed) allows to treat small-size objects (from several ten microns to a few millimeters) under precise temperature control conditions. However, it has several drawbacks; first, it performs like a perfectly agitated reactor, so that some of the solid objects leave the system shortly after they entered it. They are therefore not properly treated.

Furthermore, the fluidized medium is very erosive because of the friction of the objects against each other, especially in the vicinity of the air inlets. Using such a system should therefore be avoided when treating objects whose mechanical strength is limited.

These attrition problems can also lead to the presence of significant amounts of dust in the gaseous effluents, a dust that has to be removed before said gaseous effluents are discharged into the atmosphere.

Besides, the pressure drops in the gas circuit are higher than in the system using a travelling grate and they can be disadvantageous in some cases. Finally, the fluidized bed technology is generally rather complex from the mechanical point of view, and therefore expensive.

Besides, French patent application FR-2,634,187 discloses a vibrating bed system with a closed trough of substantially concave section.

Furthermore, French patent application FR-2,702,392 filed in the name of the applicant discloses a vibrating-elevator device for regeneration of absorbents used in fumes desulfurization. However, this device does not allow proper treatment of the "sticky" products of very small grain size (<20 microns). This document describes various means for heating and cooling the device, with either a burner or an exchange trough.

French patent application EN.97/02,658 filed in the name of the applicant discloses a vibrating elevator reactor consisting of a substantially cylindrical helical tube, intended for regeneration of reforming catalysts.

None of the aforementioned known devices allows to remove carbon deposits on solids with sizes greater than or equal to one centimeter.

SUMMARY OF THE INVENTION

The device according to the invention is aimed at overcoming the aforementioned drawbacks and at providing isothermal conditions for treating objects without degrading them.

The present invention furthermore represents a reliable, energy-saving solution easy to implement.

The other advantages of the invention are notably
- treatment of solids having various shapes, sizes, characteristics,
- high flexibility as regards the carbon content of the solids treated,
- low operating cost,
- limited investment,
- great compactness,
- high flexibility as regards the treatment rate, that can vary by a factor of 10,
- limitation of the mechanical wear of the objects treated.

The object to be treated can be subjected to gaseous atmospheres of different compositions.

The object of the invention thus is a device for removing carbon deposits on solid objects, comprising an inlet for the objects to be treated, a zone for heating said objects having a feed and an outlet for the heating gas, a zone for treating said objects by oxidation and/or gasification having a feed and an outlet for the gasification fluid, an outlet for the treated objects.

According to the invention, said heating zone and said treating zone are situated in a single enclosure and comprise a substantially flat-bottomed vibrating element intended for transport of the objects, said bottom allowing support of the objects, diffusion of the fluid through said objects and transmission of the vibrations; the device according to the invention further comprises a zone for cooling said objects, placed in said enclosure downstream from the treating zone in relation to the direction of displacement of said solids in the enclosure, and a heating means external to the enclosure is also provided.

According to an embodiment of the invention, the device further comprises a line between the outlet for the heating gases and the inlet for the cooling gases, a compressor and a valve being provided on said line.

Furthermore, the heating means comprises a burner associated with a combustion chamber, the inlet of the burner being connected to an outlet of the cooling zone and the outlet of the combustion chamber to an inlet of the heating zone.

According to a specific feature of the invention, the device also comprises a line bypassing heating means (115, 116), a line through which pass the gases when they do not need reheating.

The inlet for the gasification fluid specifically comprises a multipoint distributor.

Furthermore, the outlet for the gasification fluid comprises a multipoint collector.

In this configuration, said collector comprises a single outlet connected for example to the inlet of a heat exchanger or of a boiler.

According to a specific feature of the invention, the device advantageously comprises means for isolating the atmospheres between the heating zone and the treating zone, and between the treating zone and the cooling zone.

Besides, the treating zone can comprise several separation elements.

According to an embodiment of the invention, the substantially flat-bottomed vibrating element is a trough provided with rims, of helical general shape, fastened to a vibrator such as a cylindrical drum on the inside diameter thereof.

According to another embodiment of the invention, the substantially flat-bottomed trough is a platform common to the heating zone, the treating zone and the cooling zone.

In particular, the various gas inlets consist of perforated tubes arranged on the bottom of the trough.

According to the other embodiment of the invention, the flat element consists of gas supply vessels and the lower surface of the trough can then be made of a porous material or of a perforated sheet.

BRIEF DESCRIPTION OF THE DRAWINGS

Other features, details and advantages of the invention will be clear from reading the description hereafter, given by way of non limitative example, with reference to the accompanying drawings wherein:

FIG. 4 is a detail of the trough according to the embodiment of FIG. 3,

FIG. 5 shows an embodiment of an isolating means according to the invention, FIG. 6 illustrates another embodiment of an isolating means according to the invention, FIG. 7 is a simplified longitudinal section of the embodiment of FIG. 3, FIG. 8 is a schematic view of another embodiment of the invention, and FIG. 9 is a schematic view of a variant of FIG. 8.

DESCRIPTION OF THE PREFERRED EMBODIMENTS

Figure 1:
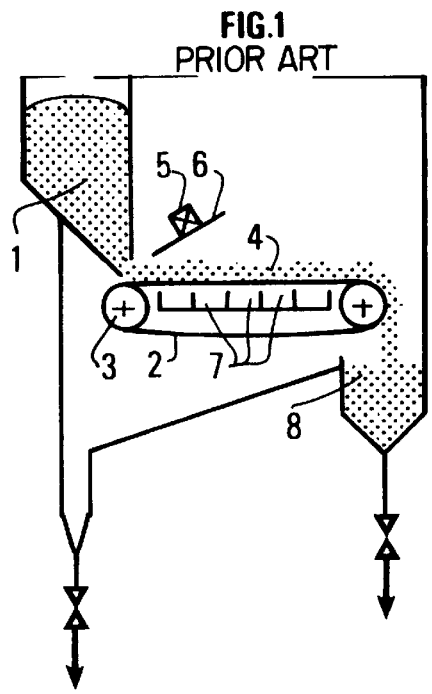
FIG. 1 is a diagram of a prior art traveling grate apparatus.
Figure 2:
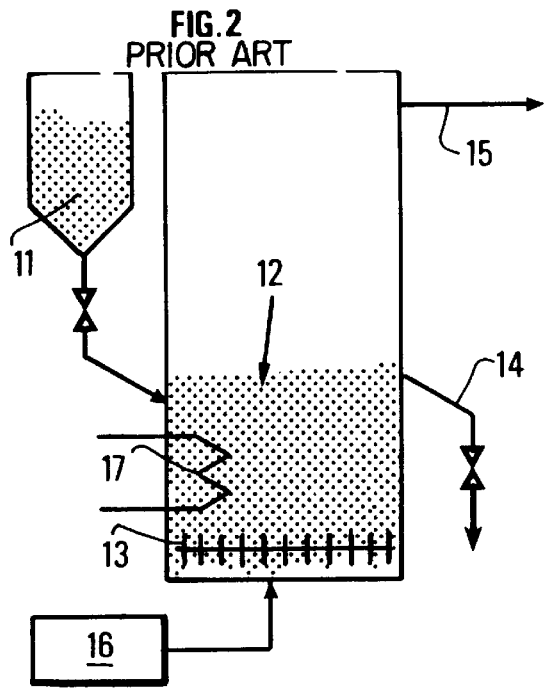
FIG. 2 is a diagram of a prior art fluidized bed system.
Figure 3:
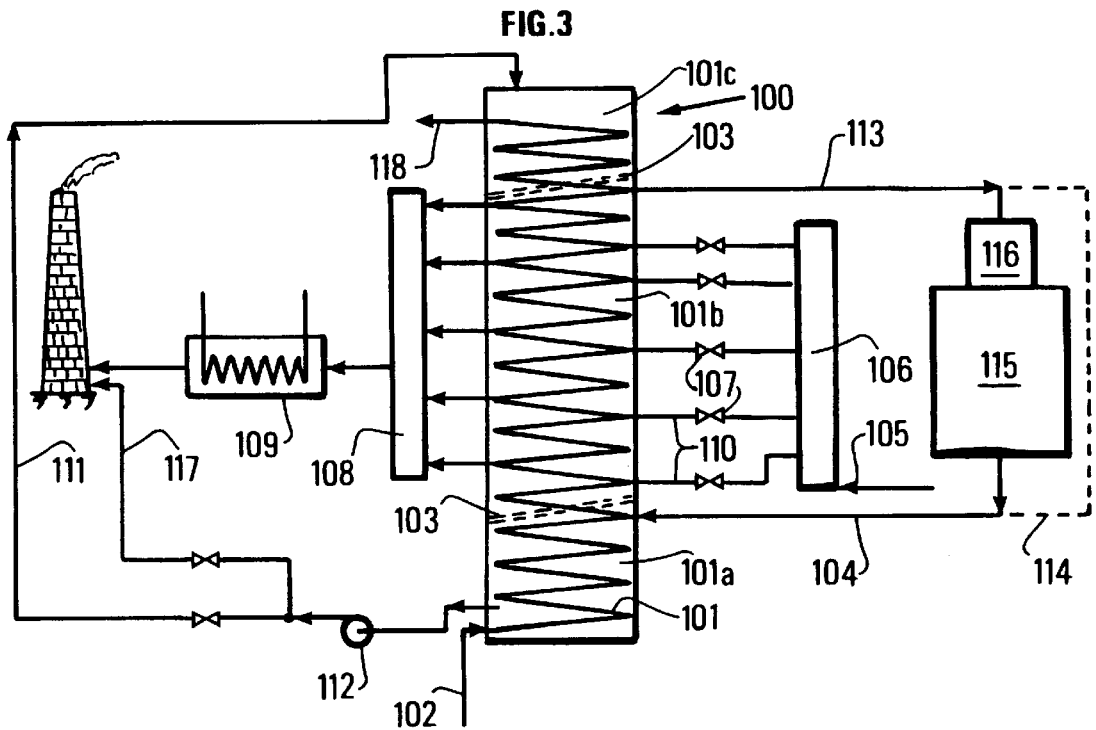
FIG. 3 is a diagram of an embodiment of the invention.

FIG. 3 diagrammatically illustrates an embodiment of the invention. This device comprises a vibrating trough 101 supplied with feed to be treated through a line 102.

Vibrating trough 101 is contained in a closed enclosure 100 and divided in three zones in which three different functions are fulfilled by means of a circulation of gaseous fluids; the three zones are pneumatically isolated from one another by means 103 allowing to have different atmospheres in each zone.

The three zones can be globally defined as follows

A descending flow consisting of a hot gas introduced through a line 104 and an ascending flow consisting of the feed to be treated flow through zone 101a, referred to as the heating zone.

Zone 101b, referred to as the reaction zone, is supplied with air, oxygen or gasification fluid through a line 105. Supply can be performed at a single point or at several points as shown in FIG. 3. From a distributor 106, a coil, a half-coil or several coils of vibrated trough 101 are supplied via lines 110 equipped with flow control systems 107. The gaseous products from the treatment are sent into a collector 108, then into a boiler or a heat exchanger 109 to yield their energy therein, and they are finally discharged into the atmosphere possibly after treating the fumes (not shown in the figure).

Thanks to this device, a gas-solid crosscurrent can be created and conversion or the thermal profile can be adjusted or optimized by adjusting each of the elementary gas flows passing through lines 110.

Zone 101c is the zone intended for cooling of the solid feed. It is supplied with cooling gas through a line 111, this gas flowing therethrough in a descending vertical flow whereas the solid feed circulates in an ascending motion.

As can be seen in FIG. 3, the solid feed heating and cooling circuits can be coupled.

In this case, a gas that can be a relatively neutral fluid such as combustion fumes close to stoichiometry or nitrogen is sent into cooling zone 101c by means of a compressor 112 placed near the outlet of heating zone 101a. The gas progressively warms up as it flows through cooling zone 101c and it flows therefrom through a line 113. It can then be directly sent to the solid feed heating zone via a bypass line 114 shown by dotted lines in FIG. 3. More generally, the gas is preferably heated by passing it into a combustion chamber 115. This chamber 115 can be equipped with a burner 116 using a fuel such as natural gas or any equivalent means.

If the gas for heating and cooling the solid feed consists of fumes, direct contact can be provided between said gas and the fumes from burner 116. In the opposite case, two independent circuits are required.

The hot gas from combustion chamber 115 is sent to the solid feed heating zone via a line 104. At the outlet of heating zone 101a, the gases can be sent into an exchanger and/or a condenser not shown in the figure, prior to entering compressor 112. If the device works with fumes, the pressure must of course be maintained constant, which can be done by partial discharge of the gases through an external line 117.

The treated solids leave enclosure 100 through a line 118 in order to be sent to any storage or complementary treatment not shown in the figure.

The temperature or the thermal profile in reaction zone 101b can be controlled by adjusting the reactive gas flows, but this solution has the drawback of linking the problem of temperature control with the conversion problem.

A preferred alternative consists in immersing, in all or part of trough 101 of reaction zone 101b, tubes through which a gaseous fluid will preferably be circulated, in order to control and vary heat extraction in a rather wide range.

FIG. 4 illustrates a possible device with a trough 120 mounted on a support 121 and tubes 122 embedded in the layer of solids to be treated.

In a particular configuration, part of the energy recovered in exchanger 109 can also be used for preheating the combustion air of burner 116, so as to minimize fuel consumption: this link is however not shown in FIG. 3.

The means for isolating the atmospheres between zones 101a, 101b and 101c can be devices such as those shown in FIG. 5. In this figure, a trough 130 supports a solid feed bed 131. Isolation of the atmospheres is achieved by means of a stop plate 132 that occupies all of the cross-section of flow of the gas and that slightly enters the solids bed. Plate 132 can possibly be mounted freely rotating on the upper trough.

FIG. 6 shows another possible isolating means. In this embodiment, a discontinuity 141 associated with a fixed plate 142 situated just downstream and allowing to obtain an accumulation of solids 144 is provided in trough 140.

It can be noted that these isolating means can also equip reaction zone 101b if the improvement of the quality of the air-solid crosscurrent is wished.

The present invention thus allows to obtain a vibrated solids bed allowing to create a medium close to the fluidized medium. Consequently, matter and heat exchanges in this medium are intense and therefore facilitate gas-solids contact, as well as precise temperature control. This thus represents a conclusive advantage in relation to all the systems working with a fixed bed or a moving bed.

Moreover, the invention allows to create nearly perfect piston flow conditions concerning the solid phase. Therefore, for a given reaction volume, the conversion rates will be higher than those that can be obtained with a perfect mixer such as a conventional fluidized bed.

Furthermore, the device according to the invention generates little attrition and objects having a limited mechanical strength can therefore be treated.

The range of objects to be treated is wide since they have characteristic dimensions from several ten microns to several centimeters.

It is furthermore possible according to the invention to introduce and to extract different gas grades at any flow point of the solids.

FIG. 7 illustrates a possible example of construction of the device according to the embodiment of the invention schematized in FIG. 3.

Said device comprises a substantially vertical cylindrical drum 201, stiffened if need be by means of reinforcements 202 as it is well known. Central drum 201 is mounted on a baseplate or suspended, and isolated from the environment by silent block type means. One or more unbalance motors (not shown) are fastened to the central drum. Vibrating trough 101 comprising a flat bottom and rims is fastened to supports 204 themselves fastened to drum 201 by holding devices 205. According to one of the embodiments, trough 101 consists of elements in the form of quarter-circles or half-circles connected to each other on supports 204. Some of these trough elements can be equipped with exchange tubes (not shown in FIG. 7 but visible in FIG. 4) connected to collectors, and these collectors communicate with the outside, preferably through branch connections fastened to cylindrical drum 201.

In other cases, the trough elements can be provided with grates for diffusion of the gas through the moving solids bed without a complete fluidized state likely to greatly disturb the flow regime being reached.

Delivery or extraction of gas in the device according to the invention can be done by means of lines 206 fastened to the cylindrical drum by branch connections 207. A flexible connection with the outside of said cylindrical drum 201 can be provided from these branch connections.

Isolation of trough 101 from the outside can be provided by sheets 208 in the form of quarter-circles or half-circles, fastened to outer supports 209 themselves fastened to supports 204.

The advantage of such a construction mode is that it allows to work with flat-bottomed troughs, whereas the known systems rather use tubes of round or oval section. The interest of the flat-bottomed trough is that it provides a more uniform layer of solids, better contact between the gas phase and the solid phase, it allows to work with high solid rates, to place the cooling means directly in the solids bed, to facilitate extrapolation operations since the layer has a substantially constant thickness at any point of the system. Furthermore, a flat-bottomed trough is more compact than systems using tubes, for an identical capacity.

The embodiment that has been described also offers the possibility of easy access at any point of the system. Assembly and dismantling are easy, and cleaning operations can be carried out readily if necessary.

FIG. 8 relates to an embodiment of the invention that differs from that of FIG. 7 in that trough 101 is globally flat. It is even preferably inclined to the horizontal.

The bottom of the trough consists of gas supply vessels 302, the gas being delivered to through inlets 303 placed below vessels 302. The upper surface 301 of vessels 302, in contact with solids bed 304, is made a porous material (metal frit or ceramic) or of a perforated sheet allowing passage of the gas while supporting the solid and transmitting vibrations thereto.

Inner baffles 306 can be added to control the gaseous flow above the solids bed. The function of elements 306 is also to isolate the various (heating 101a, treating 101b and cooling 101c) zones from one another.

Furthermore, gas extraction systems in the form of outlets 307 are provided above the solids bed.

FIG. 9 illustrates an architecture close to that of FIG. 8. The difference lies in that supply vessels 302 are replaced by perforated tubes 308 placed at the bottom of trough 101, that allow the gases to be readily fed directly into solids bed 304.

One or more perforated tubes 308 that transfer the suitable (heating, treating or cooling) fluid into the solids bed are associated with each zone 101a, 101b, 101c.

Additional inner baffles 306 can also be provided in treating zone 101b itself.

Generally, the device according to the invention can be used to remove polymer coatings on metal objects. These coatings often represent only a small percentage by mass of the objects and their removal under moderate thermal conditions, i.e. at temperatures below 500–600° C., allows to preserve their mechanical characteristics and facilitates their recycling.

Another possible application of the device according to the invention relates to objects covered with polymers and/or mixed with polymers or organic products that have already undergone a first thermal degradation by pyrolysis. Then there remains coke deposits that have to be removed, here again under moderate temperature conditions, in order not to alter the materials to be recycled.

A precise example relates to electric, copper or aluminium cables whose polymeric sheath has been removed by thermolysis. In order to recover directly exploitable materials, the carbon deposits have to be removed while preventing oxidation of the metals; the present invention is totally suited therefore.

What is claimed is:

1. A device for removing carbon deposits on solid objects, comprising an inlet for the objects to be treated, a heating zone for heating said objects having a feed and an outlet for a heating gas, a zone for treating said objects by oxidation and/or gasification having a feed and an outlet for a gasification fluid, an outlet for the treated objects, characterized in that said heating zone and said treating zone are situated in a single enclosure and comprise a substantially flat-bottomed vibrating element intended for transport of the objects, said bottom allowing support of the objects, diffusion of the fluid through said objects and vibration transmission, and in that it further comprises a cooling zone for cooling said solids, situated in said enclosure downstream from the treating zone in relation to the direction of displacement of said solids in the enclosure, and a heating means external to the enclosure is provided.

2. A device as claimed in claim 1, characterized in that it further comprises a line between the outlet for the heating gases and the inlet for the cooling gases, a compressor and a valve being provided on said line.

3. A device as claimed in claim 1, characterized in that the heating means comprises a burner associated with a combustion chamber, the inlet of the burner being connected to an outlet of the cooling zone and the outlet of combustion chamber to an inlet of the heating zone.

4. A device as claimed in claim 3, characterized in that it further comprises a line bypassing the heating means, a line through which the gases flow when they do not need reheating.

5. A device as claimed in claim 1, characterized in that the feed for the gasification fluid comprises a multipoint distributor.

6. A device as claimed in claim 1, characterized in that the outlet for the gasification fluid comprises a multipoint collector.

7. A device as claimed in claim 6, characterized in that said collector comprises a single outlet connected to the inlet of a heat exchanger or of a boiler.

8. A device as claimed in claim 1, characterized in that it further comprises means for isolating atmospheres between the heating zone and the treating zone and between the treating zone and the cooling zone.

9. A device as claimed in claim 1, characterized in that substantially the flat-bottomed vibrating element is a trough provided with rims, of helical general shape, fastened to a vibrating cylindrical drum on the inside diameter thereof.

10. A device as claimed in claim 1 characterized in that substantially the flat-bottomed vibrating element is a flat trough common to the heating, treating and cooling zones.

11. A device as claimed in claim 1, characterized in that the various gas inlets consist of perforated tubes arranged on the flat bottom of the flat trough.

12. A device as claimed in claim 10, characterized in that the bottom of the flat trough comprises gas supply vessels having an upper surface made of a porous material or of a perforated sheet.

* * * * *